(12) United States Patent
Van Greunen et al.

(10) Patent No.: US 9,439,145 B2
(45) Date of Patent: Sep. 6, 2016

(54) APPROACH FOR EXTENDED BATTERY LIFE NETWORK NODES

(71) Applicant: Silver Spring Networks, Inc., Redwood City, CA (US)

(72) Inventors: Jana Van Greunen, Woodside, CA (US); William Pugh, San Jose, CA (US); Sterling Hughes, Oakland, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 925 days.

(21) Appl. No.: 13/669,413

(22) Filed: Nov. 5, 2012

(65) Prior Publication Data
US 2014/0126346 A1    May 8, 2014

(51) Int. Cl.
*H04W 52/02* (2009.01)
(52) U.S. Cl.
CPC ............... *H04W 52/0222* (2013.01)

(58) Field of Classification Search
CPC ............... H04W 52/0209; H04W 52/0212; H04W 52/0222
See application file for complete search history.

(56) References Cited

U.S. PATENT DOCUMENTS

| | | | | |
|---|---|---|---|---|
| 2008/0151801 A1* | 6/2008 | Mizuta | ............... | H04W 52/343 370/311 |
| 2008/0183339 A1* | 7/2008 | Vaswani | ............... | G01D 4/004 700/297 |

* cited by examiner

*Primary Examiner* — Siming Liu
(74) *Attorney, Agent, or Firm* — Artegis Law Group, LLP

(57) ABSTRACT

In an embodiment, triplets of network-enabled FCIs operate to monitor the three phases of a power distribution system. In being network-enabled, the FCIs also operate as nodes of an RF mesh network. In an embodiment, upon the detection of a power failure, the triplet of network FCIs is serially operated so as to extend their networking capabilities by approximately three times.

19 Claims, 9 Drawing Sheets

```
|-------------------------- 32 bits --------------------------|
 0 1 2 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-+
|            IPv6 address of network being advertised           |
+-+-+-+-+-+-+-+-+-+-+-+-+-+-+-+-+-+-+-+-+-+-+-+-+-+-+-+-+-+-+-+-+
|                        address (contd)                        |
+-+-+-+-+-+-+-+-+-+-+-+-+-+-+-+-+-+-+-+-+-+-+-+-+-+-+-+-+-+-+-+-+
|                        address (contd)                        |
+-+-+-+-+-+-+-+-+-+-+-+-+-+-+-+-+-+-+-+-+-+-+-+-+-+-+-+-+-+-+-+-+
|                        address (contd)                        |
+-+-+-+-+-+-+-+-+-+-+-+-+-+-+-+-+-+-+-+-+-+-+-+-+-+-+-+-+-+-+-+-+
|                            Reserved                           |
+-+-+-+-+-+-+-+-+-+-+-+-+-+-+-+-+-+-+-+-+-+-+-+-+-+-+-+-+-+-+-+-+
|                     Path Cost, Max Hop Count                  |
+-+-+-+-+-+-+-+-+-+-+-+-+-+-+-+-+-+-+-+-+-+-+-+-+-+-+-+-+-+-+-+-+
|   network subnet mask    |    Destination MAC address         |
+-+-+-+-+-+-+-+-+-+-+-+-+-+-+-+-+-+-+-+-+-+-+-+-+-+-+-+-+-+-+-+-+
|                   Destination MAC address (contd)             |
+-+-+-+-+-+-+-+-+-+-+-+-+-+-+-+-+-+-+-+-+-+-+-+-+-+-+-+-+-+-+-+-+
```

APPROACH FOR EXTENDED BATTERY LIFE NETWORK NODES

BACKGROUND

1. Technical Field

Embodiments of the present invention relate generally to wireless digital communication technology and, more specifically, to an approach for extended battery life network nodes.

2. Description of the Related Art

A conventional wireless mesh network includes a plurality of nodes, each incorporating a digital radio transceiver. A given node may transmit payload data to one or more other nodes via the digital radio transceiver. The node may originate the payload data or forward the payload data on behalf of a different node. Similarly, a given node may receive the payload data from a different node to be processed or forwarded by the node. The wireless mesh network may include an arbitrary number of nodes and may include certain access points, configured to bridge data communications within the mesh network to a related service system, such as a wire line or optical communications network.

In a network that is typically represented by a utility network, the distribution part of the network may include a plurality of nodes located at end-pint utility meters with a smaller number of nodes acting as relays, and one or more Gateways providing egress to these end-point nodes. The utility network may also consist of the infrastructure part (substations, feeder stations, transformer locations, generation facilities) that is populated with monitoring and control sensors. These devices may also be part of the utility network that may be directly connected to the utility server via WAN or connected to the utility server via Gateways in the wireless network. The routing algorithm may be structured in such a fashion that these infrastructure nodes, and any selected distribution end-point nodes can establish bi-directional connectivity with minimal latency and via the fastest path. In some embodiments, these infrastructure nodes and select end-point nodes can have multi-egress capability to increase network reliability.

In traditional power distribution systems, Faulted Circuit Indicators (FCIs) have been used so as to detect faults in power distribution systems. FCIs that are further equipped with networking functionality have also been implemented in distribution automation systems so as to operate as nodes of a mesh network. Because of this increased functionality, battery backups have been implemented in FCIs. But because power failures may last longer than the battery life of each of the FCIs, the mesh network may develop significant problems upon drainage of the FCIs. For example, where the battery backup for a network-enabled FCI is approximately two hours, the network, or part of the network, may fail after two hours.

As the foregoing illustrates, what is needed in the art is a mesh network that can operate for an extended period of time after the occurrence of a power failure.

SUMMARY

Embodiments of the present invention include methods for extending the battery-backed operation of network-enable FCIs. A described embodiment includes a method for substantially serially operating a set of three FCIs so as to extend the battery-backed operation of a network node by approximately three times.

In an embodiment, triplets of network-enabled FCIs operate to monitor the three phases of a power distribution system. In being network-enabled, the FCIs also operate as nodes of an RF mesh network. In an embodiment, upon the detection of a power failure, the triplet of network FCIs is serially operated so as to extend their networking capabilities by approximately three times.

In a method according to an embodiment of the invention, upon detection of a power failure, one FCI from among the triplet of network-enabled FCIs is chosen as the lead node FCI. Such lead node FCI then takes on the networking functions of the other two FCIs. The two non-lead FCIs then enter a low power usage sleep mode. When the power is substantially depleted from the lead node FCI, networking functionality is then transitioned to one of the two remaining FCIs. When the power is substantially depleted from the second lead node FCI, networking functionality is then transitioned to the third FCI. In this way, the battery backed network node is substantially extended.

In an embodiment of the present invention, the lead node FCI is determined according to the battery level or capacity of the FCIs. For example, the FCI with the strongest battery or the largest charge is chosen as the lead node. In another embodiment, the order of lead node selection is predetermined.

In another embodiment of the present invention, it is desired not to completely drain and render inoperative the lead node FCI. This can be desirable so as not to interrupt network traffic. An embodiment of the present invention, therefore, putting the non-lead node FCIs into a sleep mode with substantially reduced power consumption. On a periodic basis thereafter, the sleeping FCIs are awakened so as to poll the status of the lead node FCI. Where the status (e.g., battery power) of the lead node FCI is above a predetermined threshold, the non-lead FCI returns to a sleep mode. But where the status of the lead node FCI is below a predetermined threshold, networking functionality is transitioned away from the first lead node FCI to a second lead node FCI. After a complete transition, the first lead node FCI is powered down. In an embodiment of the present invention, another transition can be made so as to provide for a third lead node FCI after the battery of the second lead node FCI is substantially drained.

When a node joins a network and receives a routing advertisement, such a node transmits the routing advertisement to all its neighbors. The node then receives transmission from the neighboring nodes indicating interest in joining the advertised network. If more than a threshold number of neighboring nodes are interested in the advertised route, the newly joining node inserts the route advertisement in a beacon transmission. If there is not a threshold level of interest, the node unicasts only to the neighbors who indicated interest in the advertised network. In an embodiment, the node repeats the above steps on a predetermined time basis (e.g., one per day) in order to determine interest in the advertised route that may have newly arisen.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is a simplified representation of an exemplary routing table constructed at a node after it receives network advertisements from its neighbors.

DETAILED DESCRIPTION

In the following description, numerous specific details are set forth to provide a more thorough understanding of the present invention. It will, however, be apparent to one of skill in the art that the present invention may be practiced without one or more of these specific details. In other instances, well-known features have not been described in order to avoid obscuring the present invention.

Embodiments of the present invention relate to the manner of operating network-enabled FCIs during a power failure. For example, embodiments of the present invention relate to the manner of extending the battery-backed networking capabilities of FCIs. It is, however, useful to first understand the operation of an RF network in which embodiments of the present invention can be practiced. With this understanding, the operation of battery backed network-enabled FCIs according to embodiments of the present invention can be better appreciated as disclosed further below.

System Overview

Figure 1A:
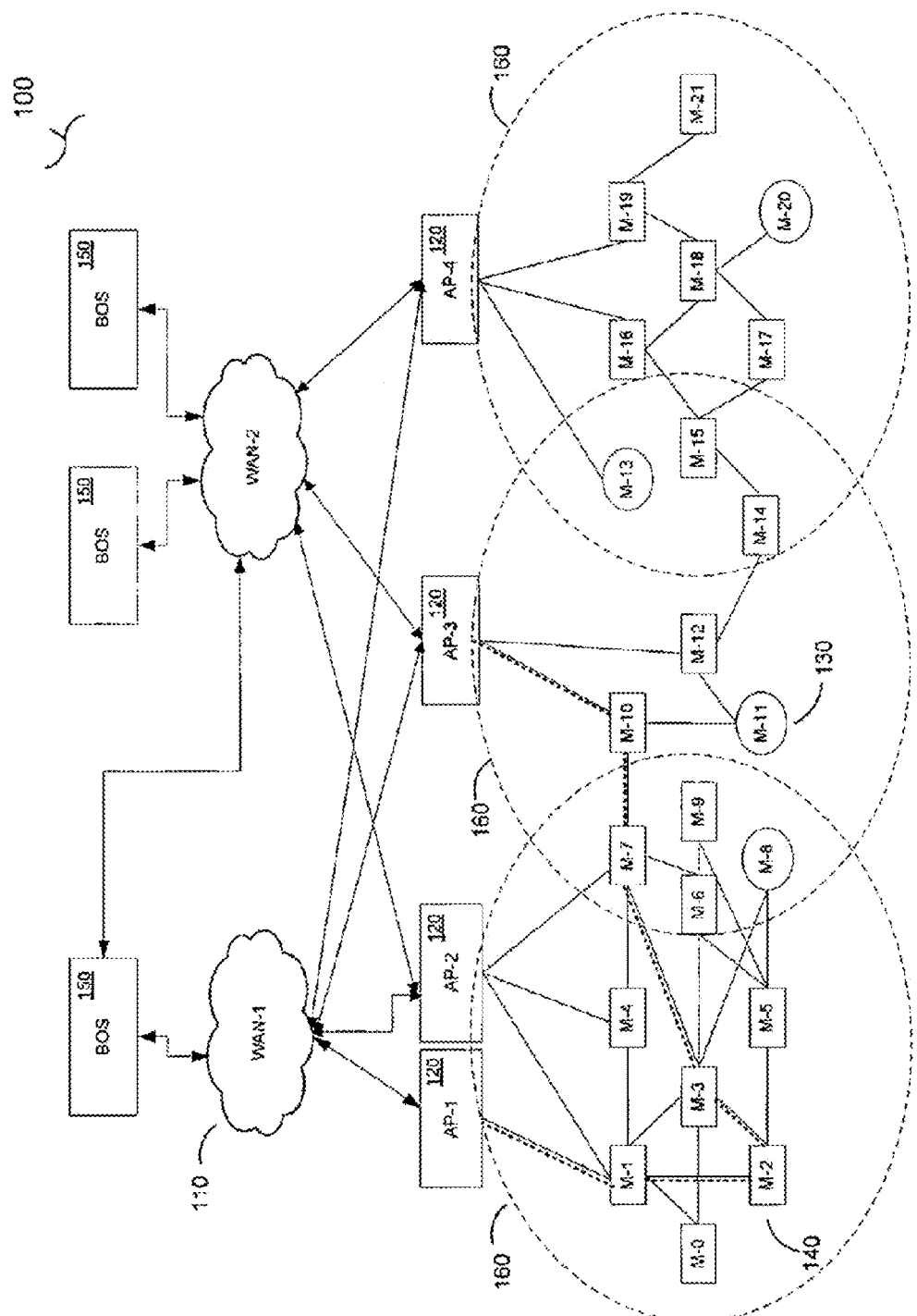
FIG. 1A illustrates the overall network architecture of one possible embodiment.

Referring to FIG. 1A, a communications network may include a plurality of nodes 140 and 130 linked to one another and to one or more access points 120 within wireless LANs 160. Unless otherwise noted, access points (APs) 120 are also called gateway as known to those of ordinary skill in the art. APs 120 may be linked to one or more back office utility servers (BOS) 150 via one or more wide area networks (WANs) 110. BOS 150 may be implemented on one or more computing devices.

In an embodiment implemented as a utility network, LANs 160 may be neighborhood area networks (NANs) corresponding to a neighborhood or service area for the utility. As shown in the example embodiment, multiple LANs 160 may be used, which may or may not overlap. The nodes may be any type of network device. Examples of network devices, or nodes, include utility nodes, which may include a utility meter or may connect to a utility meter. A utility meter is a device that is capable of measuring a metered quantity, typically a commodity like electricity, water, natural gas, etc. Utility nodes that connect to a utility meter may include a network interface card (NIC) for communicating on a network, may include one or more RF transceivers for communicating on one or more wireless LANs, and may include one or more utility meter interface devices (a given utility node may interface with multiple meters, which may or may not meter different commodities, such as electricity, gas, water, etc.).

Utility nodes may also include an in-premise device interface to connect to in-premise devices through an in-premise network (which may or may not be a wireless network). An in-premise device interface connects to in-premise devices so as to provide a communications link between the utility node and the in-premise devices. Additionally, the utility node may provide a communications link between the in premise devices and the wireless communications network connected to the utility node.

Other examples of network devices include communication devices, such as set-top boxes (as may be used in cable television or satellite television delivery), household appliances, computers or computing devices, networking devices such as relay, gateways, routers, phones, battery storage devices, transportation devices, transportation vehicles, entertainment devices, or other devices as may be found in a home, business, roadway, parking lot, or other location.

Wireless LAN 160 may be any type of wireless network and may use any frequency, communications channel or communications protocol as would be known to those of ordinary skill in the art. In embodiments of the present invention, one or more of wireless LANs 160 are FHSS (Frequency-Hopping Spread Spectrum) networks or DSSS (Direct Sequence Spread Spectrum) networks.

In an embodiment, in an initial network discovery phase, a node may use a process to scan through slots or channels to get to its neighbors and to get acknowledgement responses and an initial value of link quality estimates from those discovered neighbors. This initial link quality estimate may be used to select a number of best upstream neighbors to talk to (the number selected may be configurable).

In an embodiment, a node proceeds with a registration process with its upstream nodes when the node intends to use these upstream nodes for egress to another network. In response to the registration message from the node, an upstream node adds the registering downstream node to the downstream routing table entries maintained by the upstream node. The upstream nodes may also proceed to maintain up-to-date timing information about the registering node in response to the registering by the downstream node. Nodes routing through each other are preferably set up to exchange timing information periodically in order to remain in synchronization.

The registration of a node with one or more of the APs may then take place. This registration process can prompt the APs to add the registering node to their routing tables and insure that the status of the node is up to date. The registration of a node with an AP may occur periodically but more infrequently than the registration with an upstream node. In an embodiment, the frequency is on the order of once every 12 hours.

Each node (e.g., 130 and 140) in the wireless communication network may be identified for end-to-end routing in any particular network by a unique address such as an IPv6 address. IPv6 addresses are typically composed of two logical parts: a 64-bit network prefix and a 64-bit host part. Upon successful registration by a node with the AP, the AP may hand the node data packets in the form of a TLV (Type Length Value) containing the network configuration, including the IPv6 globally routable prefix associated with the subnet the node is joining. The node may then send a Dynamic DNS update request (RFC 2136) to the Network Host Utility System DNS server. When a utility server (e.g., BOS 150) wants to send traffic into a wireless LAN, it may resolve the node's DNS name into an IPv6 address for Layer 3 (IP) routing through the WAN to the correct AP. If the WAN is IPv4-based, IPv6 packets may be encapsulated within IPv4 with appropriate prefixes for tunneling through the IPv4 cloud. At BOS 150 and the AP 120, the received IPv6 packet would be decapsulated. Other addressing schemes as known in the art are also appropriate for use with embodiments of the present invention.

Link Layer Addressing

Each node (e.g., 130, 140) may be identified for routing in the Wireless LAN by a unique link layer address assigned to its radio interface. For example, each node may have only a single interface. Other embodiments can have multiple discrete link layer addresses. Link layer address is typically 8 bytes long and is the device's MAC address. The link layer broadcast address may be hex ff:ff:ff:ff:ff:ff (all ones). Packets transmitted with this local broadcast address can be processed by those who receive them.

Routing Subsystem

A routing subsystem can utilize the code entity DLF (Data Link Forwarder) for Layer 2 routing and the code entity MLME (Media Access Control Sub-Layer Management Entity) for acquiring neighbor nodes and maintaining timing information between neighbors. The DLF interfaces to the MLME through a set of APIs.

Neighbor Scan and Discovery

In an embodiment of the present invention, a node may discover neighboring nodes using two basic processes: broadcast discovery and neighbor queries. When a node comes up, the MLME may find all of the node's adjacencies (or directly connected RF links) through a broadcast discovery process. It may do this randomly to determine when it should start sending broadcast discovery frames and then choose the channel on which to send the broadcast discovery frame (channel selection may be done randomly). It may then cycle through every slot, transmitting each successive broadcast discovery frame on the next slot, and wrapping at the last slot.

Once the discovery process has found a neighbor (adjacency), or a set of neighbors, the MLME may then query the discovered neighbors for their direct neighbors (the direct neighbors can be provided in response). This may be done to discover the network environment more quickly (in contrast to broadcasting a large number of frames in hopes of contacting any one particular device). The neighbor query mechanism can be a simple query/response. For example, a node receiving a neighbor query applies the criteria to the nodes in its list, and the nodes that "match" the criteria are placed in the neighbor response. If no criterion is given, all the nodes in the list may be placed in the neighbor response.

Figure 2:
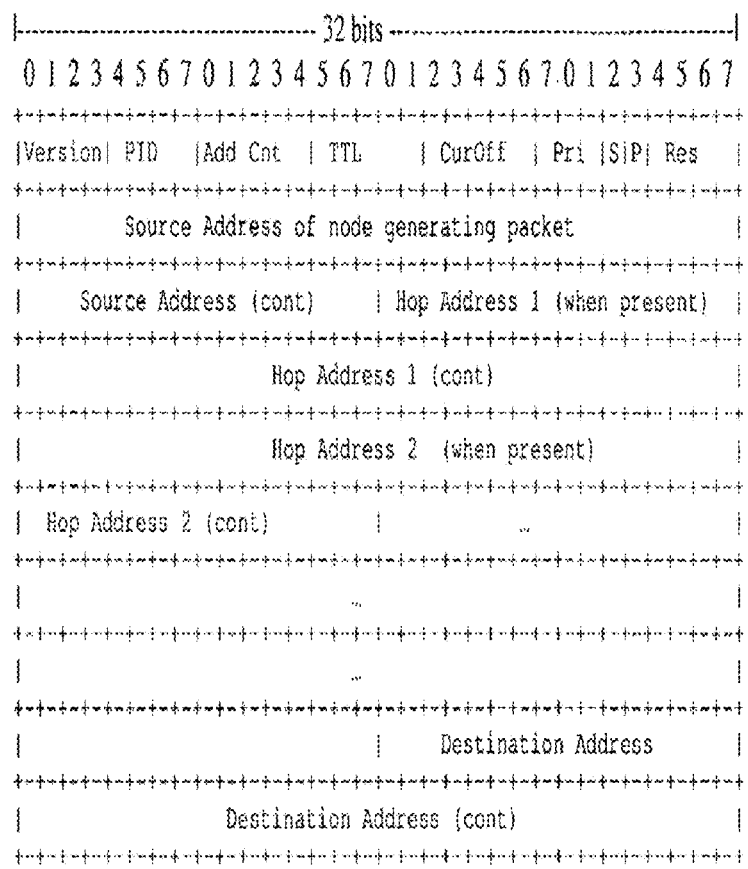
FIG. 2 shows an exemplary format of the Network Advertisement message sent out by a node about the best path to a particular network known by it.

Using the list of neighbors built up by the MLME, the DLF may try and find advertised egress routes. It may accomplish this task by listening for "Network Advertisement" (NADV) messages from the nodes in the MLME's neighbor table. The NADV message may advertise a set of egress routes, which may include the path cost and hop count of the egress routes. Path cost can be the lowest cost associated with that egress, amongst all candidate paths. Hop count can be the highest number of hops that are taken to reach that egress. Hop count can be used to prevent routing loops, and may not be used in conjunction with the path cost. An example of the format of the NADV message is shown in FIG. 2. The Destination MAC address can be the MAC address of the node originating the network advertisement. In most cases it can be the egress point (or the Gateway) since networks can be identified by their egress nodes.

From the advertisements received in the form of NADV messages, each node can construct a routing table listing the available networks, the egress node identifying each of the networks, and the available paths to that egress node. Each of the available paths can be described with a next hop, flags describing the type of path, and the link and path costs. An example of the information that may be captured in the routing table is laid out in FIG. 3.

From the routing table information, nodes may construct a forwarding or next-hop table with a list of destination MAC addresses, a type associated with each address, and the path cost for it. In one embodiment, the type reflects the selection preference associated with the destination and may be one of the five: source-routed, hop-by-hop, direct adjacency, breadcrumb, or local.

Node Registration with Upstream Neighbors

Each node may explicitly register with the upstream nodes it intends to use in a network. This registration means that the upstream node may now attempt to keep up-to-date timing information about the registering node, and keep a downstream routing table entry. Thus, traffic cannot only flow towards the egress, but also back to the node (downstream).

The node registers with its upstream node by sending it an "Upstream Register" message. The "Upstream Register" message may contain the device's type, and a neighborhood health metric. The neighborhood health metric can be used to cull downstream nodes when an upstream becomes overloaded. Devices with a low neighborhood health metric (and therefore presumably low path diversity) can be preferentially selected before devices with high neighborhood health metrics.

Implementation of NIC-Enabled FCIs

Figure 1B:
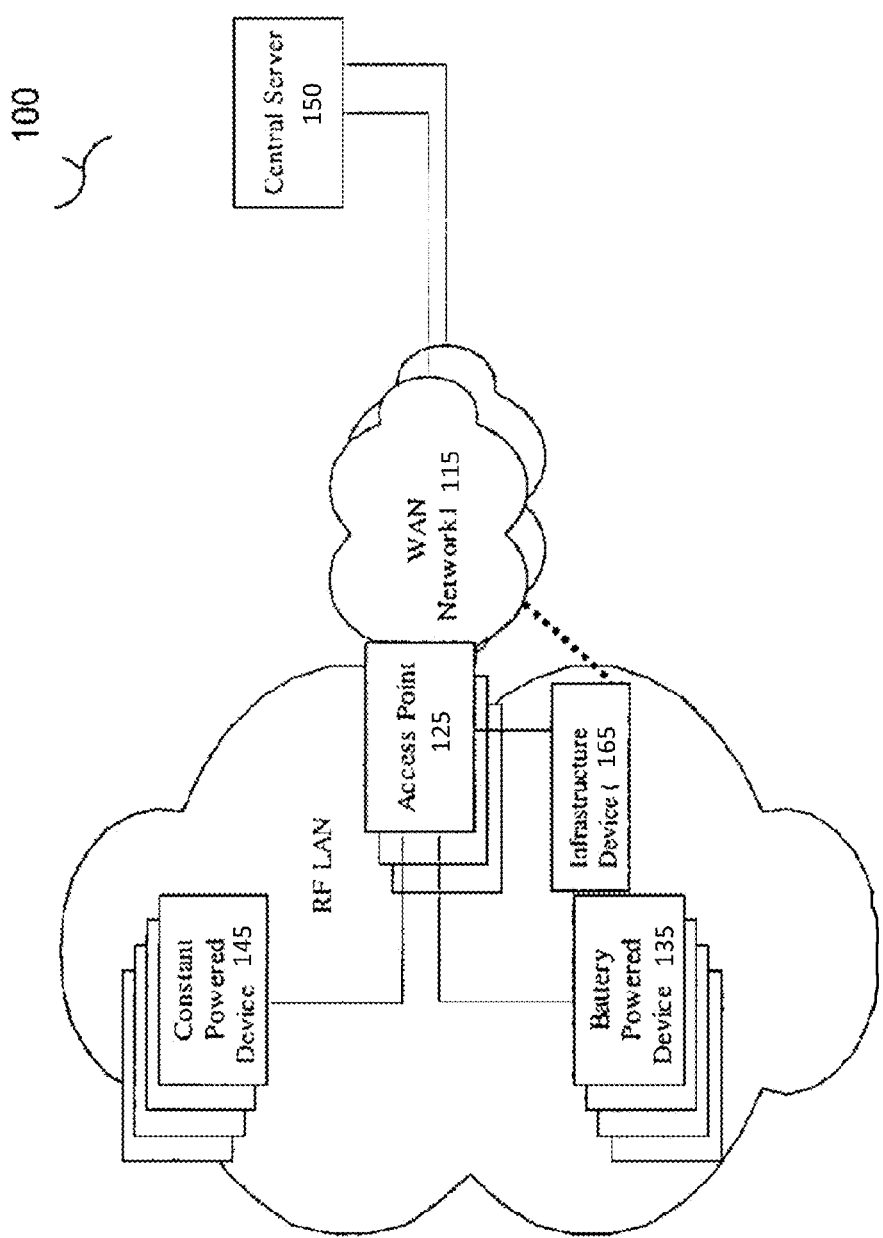
FIG. 1B is an alternate representation of the overall network architecture of one possible embodiment.
Figure 4:
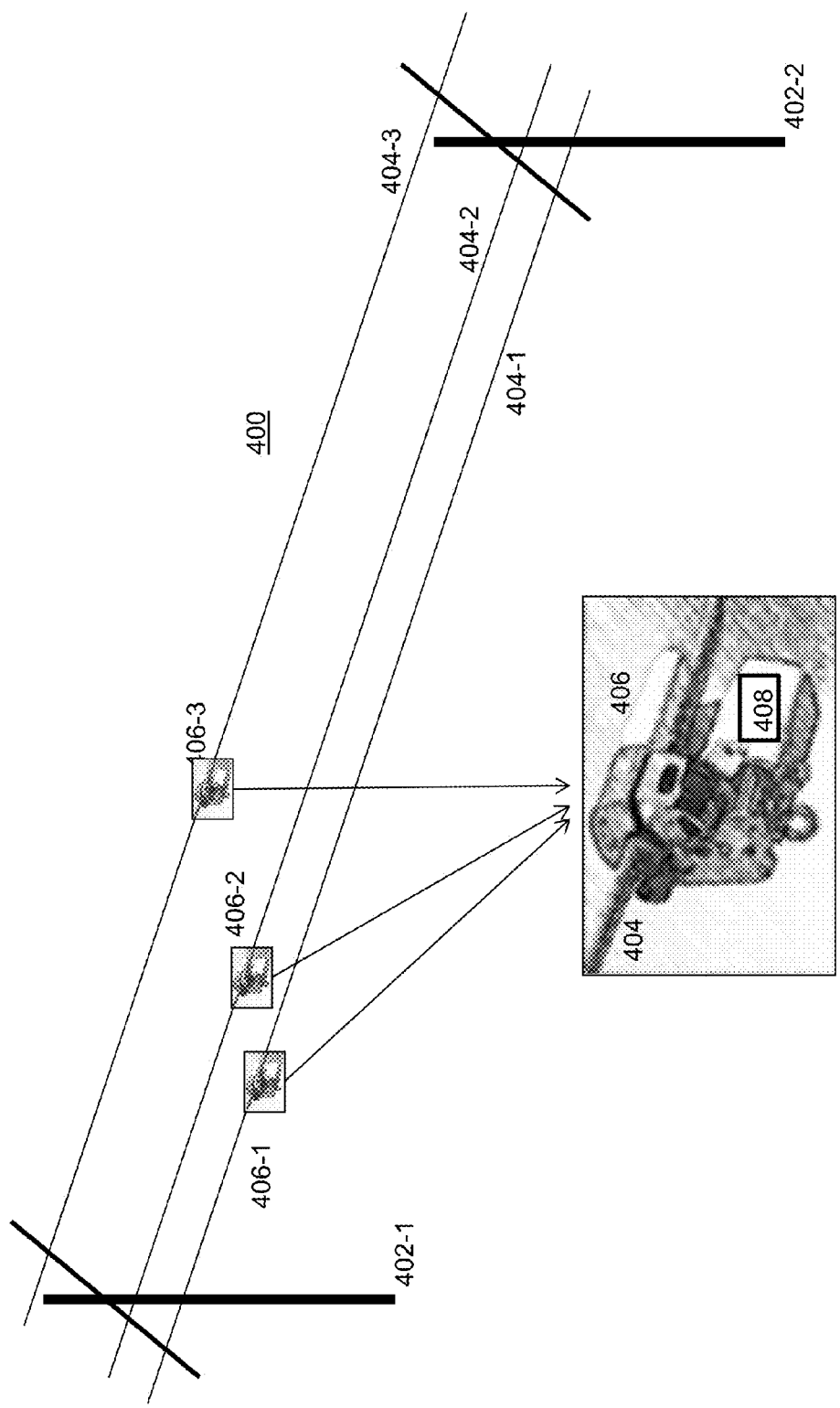
FIG. 4 is a diagram of an exemplary implementation of a triplet of FCIs according to an embodiment of the present invention.

To be discussed now are battery-backed network-enabled FCIs that can act as nodes 130 and 140 as shown in FIG. 1. Shown in FIG. 4 is a diagram of the manner in which NIC-enabled FCIs are implemented in a power distribution system 400 according to an embodiment of the present invention. As shown in FIG. 4, power distribution system 400 includes a plurality of power poles such as power poles 402-1 and 402-2. On such power poles, three-phase power lines 404-1, 404-2, and 404-3 are suspended. Each of these power lines distributes one phase of a three-phase power system. FCIs 406-1, 406-2, and 406-3 are coupled to power lines 404-1, 404-2, and 404-3, respectively, so as to monitor their status.

In traditional systems, FCIs were limited in functionality to monitoring the status of the power lines. In an embodiment of the present invention, however, FCI 406 (e.g., FCIs 406-1, 406-2, and 406-3) includes network interface card (NIC) 408 that includes functionality for operating as nodes in an RF mesh network and further includes computing resources so as to implement methods according to embodiments of the present invention. FCIs 406 are, therefore, able to report the status of power lines 404 (e.g., power lines 404-1, 404-2, and 404-3) and are also able to receive and forward network communications in an RF mesh network through the use of NIC 408. For example, FCIs 406 can operate as nodes 140 and 130 as shown in FIG. 1 as discussed above.

In an embodiment, FCI 406 is continuously inductively powered by power line 404 which it monitors. When power line 404 is properly functioning, NIC 408 has sufficient power to operate continuously. FCI 406 is further provided with a battery backup system for situations where power lines 404 fail and are no longer conducting power that can be inductively coupled to FCI 406. Such battery power, however, is limited. For example, the batteries of certain FCIs are specified to power the FCI for approximately two hours.

Where power fails to all three phases of power (e.g., no power to power lines 404-1, 404-2, and 404-3), the set of three FCIs is able to operate their collective NICs for two hours. Notably, however, in many situations NIC 408 of an individual FCI 406 has enough communication capacity to handle the network traffic of the collective three FCIs 406-1, 406-2, and 406-3. Moreover, whereas FCIs 406-1, 406-2, and 406-3 may be staggered across the spans of power lines 404-1, 404-2, and 404-3, respectively, they are seen as essentially the same point from the perspective of other wireless nodes. For example, from a distant node, the distance and wireless communication path to each of FCIs 406-1, 406-2, and 406-3 is essentially the same.

Extending Battery Life of a Set of NIC-Enabled FCIs

An embodiment of the present invention operates each of FCIs 406-1, 406-2, and 406-3 serially in time so as to substantially extend the operating time of the collective FCIs 406-1, 406-2, and 406-3 by three times. For example, instead of simultaneously operating all three FCIs 406-1, 406-2, and 406-3 and their corresponding NICs 408 for two hours, an embodiment of the present invention essentially serially operates only one FCI 406 at a time to obtain three times the operating time of essentially the same RF node. Note that in certain discussions below, the collection of three FCIs 406-1, 406-2, and 406-3 will be called a triplet of FCIs 406 for convenience.

Figure 5:
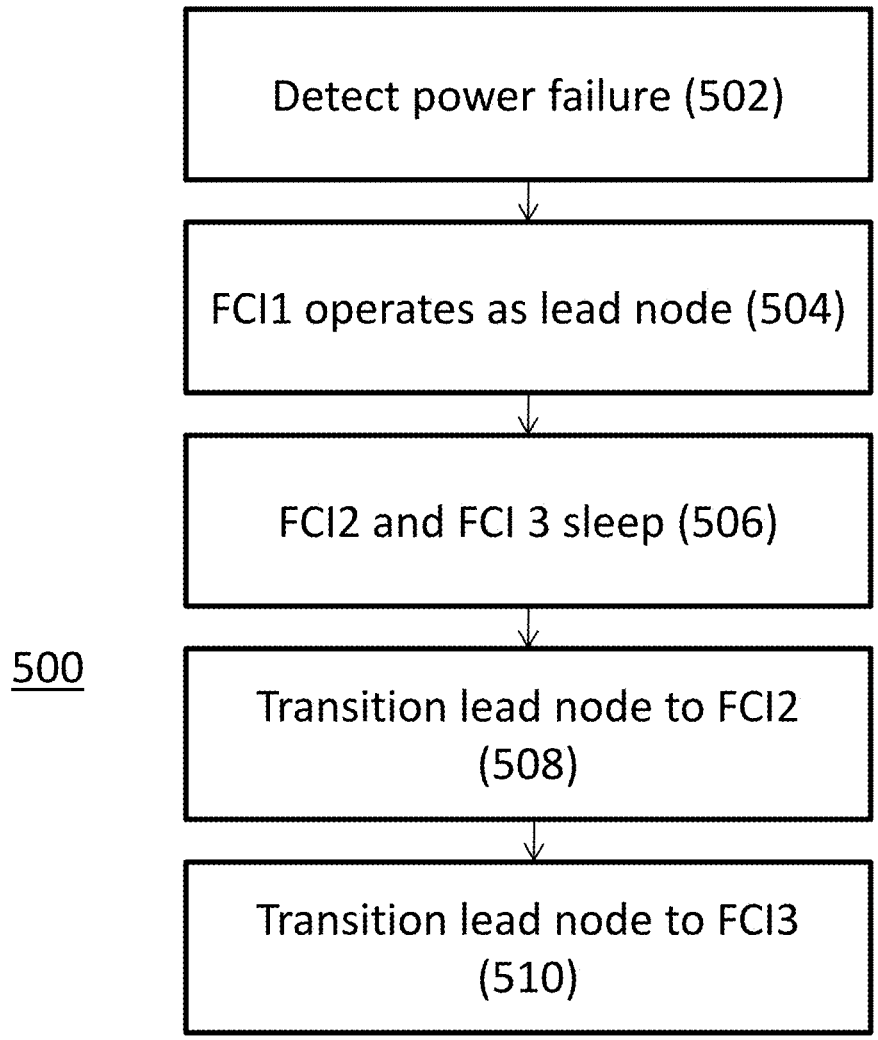
FIG. 5 is a flowchart for a method according to an embodiment of the present invention for extending the battery life of a set of FCIs.

An embodiment of the present invention for extending the operating time of a battery-operated triplet of FCIs 406 is shown in flowchart 500 of FIG. 5. It should be noted that the described embodiments are illustrative and do not limit the present invention. It should further be noted that the method steps need not be implemented in the order described. Indeed, certain of the described steps do not depend from each other and can be interchanged. For example, as persons skilled in the art will understand, any system configured to implement the method steps, in any order, falls within the scope of the present invention.

As shown in FIG. 5, method 500 begins when a power failure is detected in the power lines that are being monitored by the FCIs. At step 504, FCI1 is chosen to operate as the lead node. In doing so, FCI1 takes over the RF mesh operations that were being handled by FCI2 and FCI3 so as to allow FCI2 and FCI3 to smoothly transition into a sleep or reduced power mode at step 506. Note that in the present discussion, the terms FCI1, FCI2, and FCI3 are intended to be references to any arbitrary FCI in the triplet and is not intended to be a reference to any particular FCI.

FCI1 continues to operate as the lead node until it loses power and transitions its lead node functions to FCI2 at step 508. Preferably, FCI1 is not completely drained of power so as to smoothly transition network functionality to FCI2 at step 508.

FCI2 continues to operate as the lead node until it loses power and transitions its lead node functions to FCI3 at step 510. Preferably, FCI2 is not completely drained of power so as to smoothly transition network functionality to FCI3 at step 514. In performing method 500 of FIG. 5, the triplet of FCIs is able to perform RF networking functionality for substantially three times the operating time of any one FCI.

Figure 6:
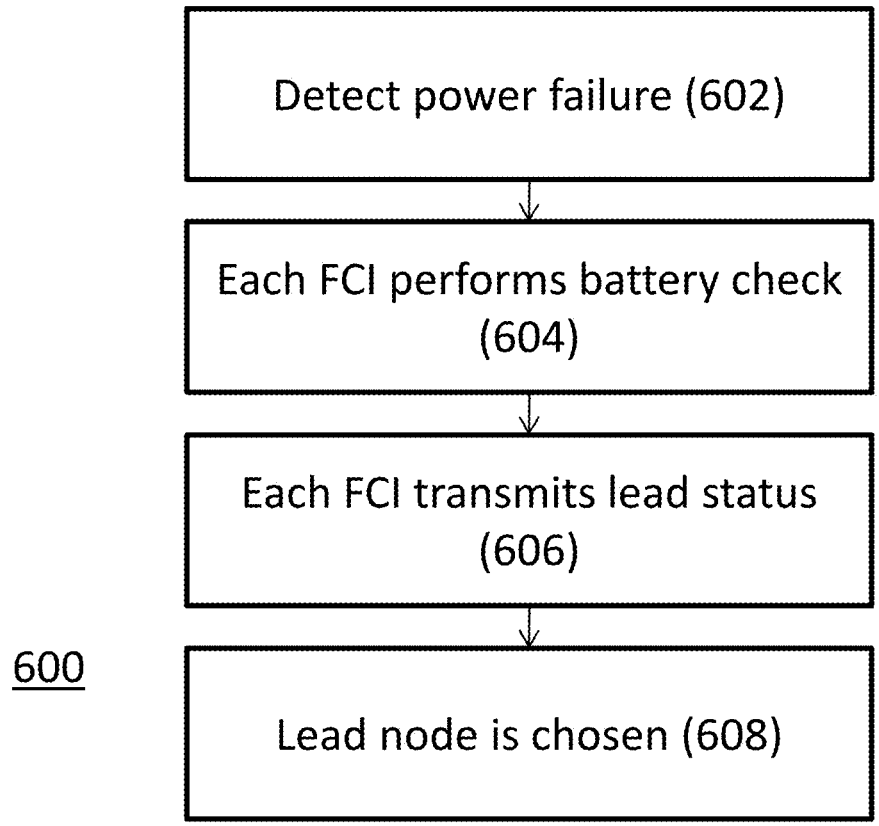
FIG. 6 is a flowchart for a method according to an embodiment of the present invention for selecting a lead node FCI.

An embodiment of the present invention for choosing a lead node among a triplet of a battery-operated FCIs 406 is shown in flowchart 600 of FIG. 6. It should be noted that the described embodiments are illustrative and do not limit the present invention. It should further be noted that the method steps need not be implemented in the order described. Indeed, certain of the described steps do not depend from each other and can be interchanged. For example, as persons skilled in the art will understand, any system configured to implement the method steps, in any order, falls within the scope of the present invention.

As shown in FIG. 6, method 600 begins when a power failure is detected at step 602 in the power lines that are being monitored by the FCIs. In an embodiment, at step 604, each FCI performs a battery check. For example, various types of information may be available regarding the functionality of the battery of each FCI. For example, a battery strength parameter may be available that provides an indicator of the relative health of the battery. Alternatively, a battery life estimate may be available based on short-term or long-term utilization information.

Each FCI then transmits a lead status message at step 606. In an embodiment, the message transmission time is randomized with respect to the battery status. For example, nodes with larger battery power send their message sooner. In this way, the FCI with the strongest battery transmits its lead status message first and has a higher likelihood of indeed becoming the lead node.

In certain situations it is preferred to choose the FCI with the best battery status as the first lead node because the battery life of one FCI may be sufficient to provide RF networking functionality for the duration of the entire power failure. For example, steps 508 through 514 of FIG. 5 may be obviated if the power failure is shorter than the battery life of the first-chose lead FCI.

Other schemes may be implemented for choosing a lead node. For example, a lead node can be chosen as a first FCI to transmit its detection of a power failure. In yet another embodiment, a priority may be predetermined among the triplet of FCIs for functioning as a leader.

At step 608 according to an embodiment of the present invention, the FCI that transmits the first lead status message is chosen as the first lead node FCI. In another embodiment, where battery status information is transmitted at step 606, a lead node FCI is chosen at step 608 according to the best battery status (e.g., strongest battery). Other implementations are also possible as would be understood by those of ordinary skill upon understanding the teachings of the present invention.

Figure 7:
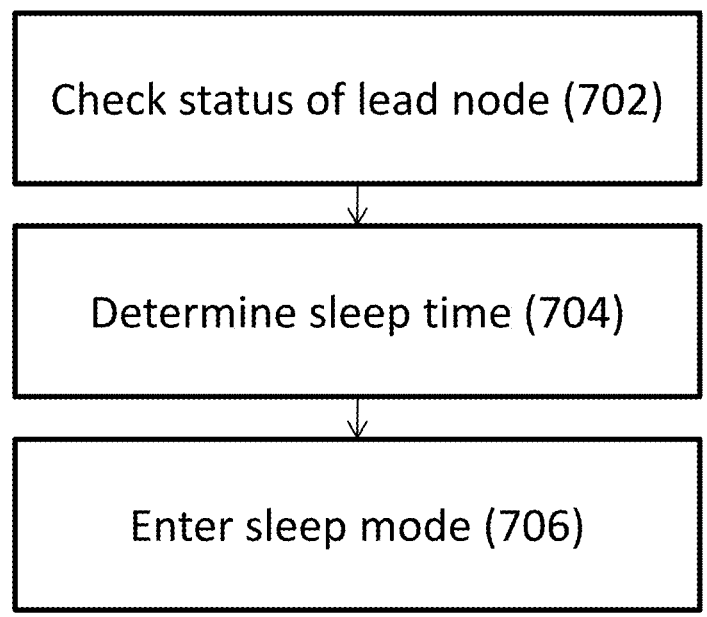
FIG. 7 is a flowchart for a method according to an embodiment of the present invention for placing a non-lead node FCI into a sleep mode.

An embodiment of the present invention for entering a sleep mode for battery-operated FCIs 406 that are not chosen as the lead node FCI is shown in flowchart 700 of FIG. 7. It should be noted that the described embodiments are illustrative and do not limit the present invention. It should further be noted that the method steps need not be implemented in the order described. Indeed, certain of the described steps do not depend from each other and can be interchanged. For example, as persons skilled in the art will understand, any system configured to implement the method steps, in any order, falls within the scope of the present invention.

As shown in FIG. 7, after a lead node FCI is chosen, each FCI that is not chosen as the lead checks the status of the lead node at step 702. For example, in an embodiment, the nodes not chosen as the lead node obtain battery information from the lead node. In another embodiment, network utilization information may also be obtained. Based on the status of the lead node, a non-lead node FCI determines an amount of time to sleep at step 704. For example, based on battery level information, an estimate can be generated for the theoretical operating time of the lead node. In another embodiment, an estimated operating time for the lead node is generated based on battery information as well as network utilization information. For example, if there exists a high average network utilization, it can be expected that the battery of the lead node will be more quickly depleted. In an embodiment, a sleep time is chosen that is shorter than the expected battery life of the lead node. This is preferred so as to more smoothly transition lead node functionality from one FCI to another without disrupting network communications. For example, a sleep time may be chosen as a percentage (e.g., 90%) of the expected battery life of the lead node. Other implementations are also possible as would be understood by those of ordinary skill upon understanding the teachings of the present invention.

At step 706, the non-lead node FCI enters a sleep mode for the time determined at step 704. In a triplet configuration according to an embodiment of the present invention, one FCI is selected as the lead node and the remaining two FCIs independently perform method 700 of FIG. 7 to enter a sleep mode and preserve power. In an embodiment of the present invention the determined sleep time is randomized within a range so that the two non-lead FCIs do not remain in a sleep mode for exactly the same time. Other implementations are also possible as would be understood by those of ordinary skill upon understanding the teachings of the present invention.

A sleep mode can be implemented in various ways. For example, in an embodiment, a sleep mode is implemented as a reduced power mode from which an FCI and its network capabilities can quickly power up. Preferably, such a sleep mode uses a low amount of power. In another embodiment, a sleep mode is implemented as a complete shutdown of the NIC. This embodiment uses the least amount of power during the sleep mode but may use more power to power up and may take longer to power up than a reduced operation sleep mode. Other implementations are also possible as would be understood by those of ordinary skill upon understanding the teachings of the present invention.

Figure 8:
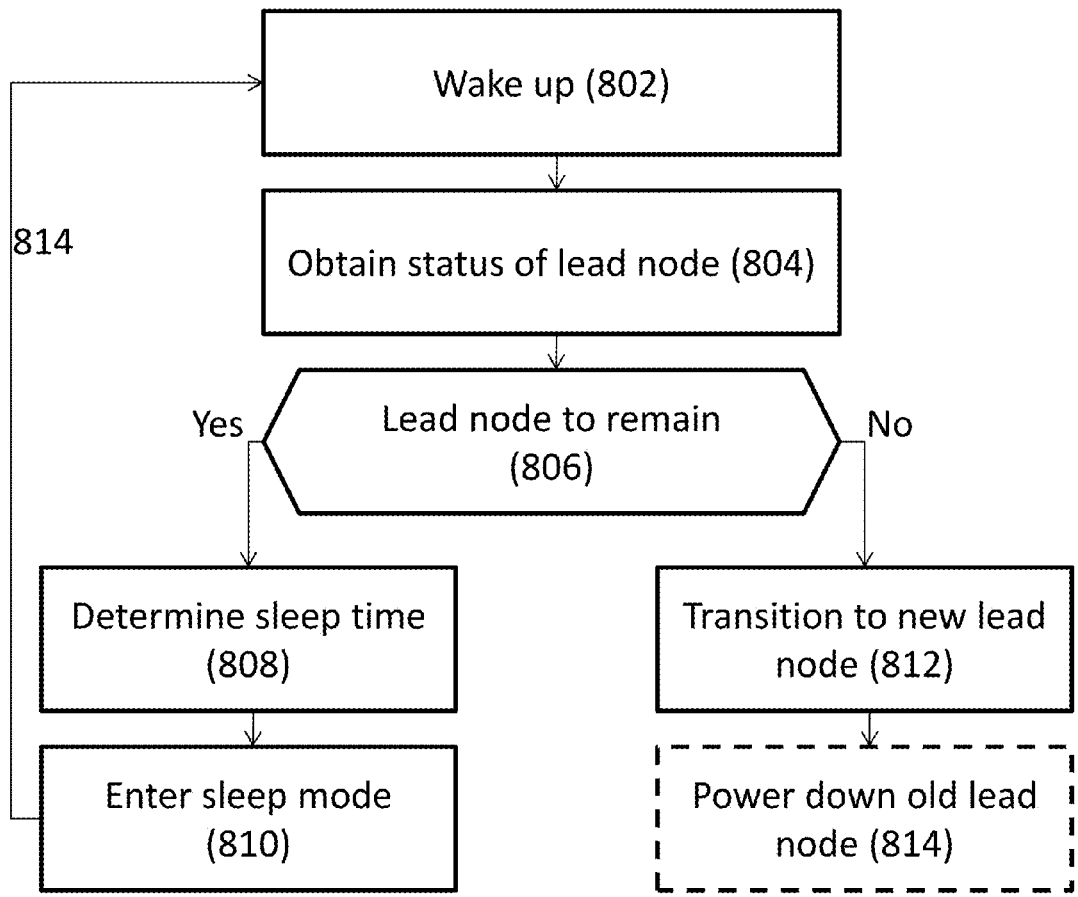
FIG. 8 is a flowchart for a method according to an embodiment of the present invention for transitioning lead node functionality from a first lead node to a second lead node.

An embodiment of the present invention for transitioning lead node functionality from one battery-operated FCI 406 to another is shown in flowchart 800 of FIG. 8. It should be noted that the described embodiments are illustrative and do not limit the present invention. It should further be noted that the method steps need not be implemented in the order described. Indeed, certain of the described steps do not depend from each other and can be interchanged. For example, as persons skilled in the art will understand, any system configured to implement the method steps, in any order, falls within the scope of the present invention.

In an embodiment, method 800 is independently implemented by each non-lead node FCI. As shown in FIG. 8, at step 802, a sleeping FCI wakes up. Upon waking up, such FCI obtains the status of the lead node at step 804. For example, the FCI may first check for the existence of the lead node. This can be important because, although a sleep time was determined so as to wake up before the lead node was drained of power, many things could have happened while the FCI was sleeping. For example, the lead node FCI may have become completely drained of power. Also, because the non-lead node FCIs operate independently in an embodiment of the invention, another FCI may have assumed lead node functionality.

Based on the status of the lead node, a determination is made at step 806 as to whether the then-existing lead node can remain the lead node. In an embodiment, based on a predetermined threshold battery level, a lead node may remain as a lead node. For example, if the battery level of the lead node is above a predetermined level (e.g., below 10% of its useful level), it will remain the lead node and steps 808 and 810 are performed. But if the battery level of the lead node is below a predetermined level (e.g., above 10% of its useful level), the FCI performing method 800 will then perform step 812. Other criteria can be used at step 806 while keeping within the teachings of the present invention. For example, network utilization information may also be considered.

Where it is determined that the then-existing lead node should continue as the lead node, step 808 is performed to determine a sleep time for the FCI. For example, based on battery level information, an estimate can be generated for the operating time of the lead node. In another embodiment, an estimated operating time for the lead node is generated based on battery information as well as network utilization information. For example, if there exists a high average network utilization, it can be expected that the battery of the lead node will be more quickly depleted. In an embodiment, a sleep time is chosen that is shorter than the expected battery life of the lead node. This is preferred so as to more smoothly transition lead node functionality from one FCI to another. For example, a sleep time may be chosen as a percentage (e.g., 90%) of the expected battery life of the lead node.

At step 810, the FCI that was non-lead node FCI enters a sleep mode for the time determined at step 808. After sleeping for the determined amount of time, method 800 is repeated as indicated by arrow 814.

Where it is determined that the then-existing lead node should not continue as the lead node, step 812 is performed in an embodiment so as to transition lead node functionality to the FCI performing method 800. In an embodiment, the then-existing lead node notifies all of its network connected nodes to transition networking functionality to the new lead node FCI. In another embodiment, the new lead node FCI transmits its availability to accept network traffic. After all networking functionality is transitioned from the old lead node to the new lead node, step 814 is performed to power down the old lead node. Note that steps 802 through 812 are shown in solid-line boxes to indicate that in an embodiment such steps are performed by an FCI that was not chosen as the initial lead node, and step 814 is shown in a dotted-line box to indicate that it is perform by a separate FCI (i.e., the initially chosen lead node).

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method for increasing the operating time of a collection of battery-backed wireless network nodes, the method comprising:
   detecting a power outage within a plurality of power lines that power a plurality of nodes;
   in response to detecting the power outage, selecting a lead node from among the plurality of nodes, wherein each node in the plurality of nodes is configured to access a wireless network, and wherein each node in the plurality of nodes that is not the lead node comprises a non-lead node;
   transitioning network functionality from the non-lead nodes to the lead node; and
   placing each non-lead node in a reduced power state for a respective predetermined time.

2. The method of claim 1, wherein each node in the plurality of nodes is incorporated as part of a fault circuit indicator.

3. The method of claim 1, further comprising selecting the lead node responsive to battery status of the plurality of nodes.

4. The method of claim 1, further comprising, for each of the plurality of nodes, transmitting a lead status message responsive to a battery status, wherein the lead node is selected as a first node to transmit the lead status message.

5. The method of claim 1, further comprising determining the respective predetermined time responsive to the battery status of the lead node.

6. The method of claim 1, further comprising waking up a first non-lead node; obtaining a second status of the lead node; and determining whether the lead node should maintain its networking functionality.

7. The method of claim 6, further comprising placing the first non-lead node in a reduced power state for a second predetermined time based on the second status of the lead node when the lead node is determined to maintain its networking functionality.

8. The method of claim 6, further comprising transitioning network functionality from the lead node to the first non-lead node when the lead node is determined to not maintain its networking functionality.

9. The method of claim 8, further comprising powering down the lead node after network functionality has been transitioned to the first non-lead node.

10. A non-transitory computer-readable medium including instructions that, when executed by a processor, causes the processor to manage a collection of battery-backed wireless network nodes, by performing the steps of:
    detecting a power outage within a plurality of power lines that power a plurality of nodes;
    in response to detecting the power outage, selecting a lead node from among the plurality of nodes, wherein each node in the plurality of nodes is configured to access a wireless network, and wherein each node in the plurality of nodes that is not the lead node comprises a non-lead node;
    transitioning network functionality from the non-lead nodes to the lead node; and
    placing each non-lead node in a reduced power state for a respective predetermined time.

11. The non-transitory computer-readable medium of claim 10, wherein each node in the plurality of nodes is incorporated as part of a fault circuit indicator.

12. The non-transitory computer-readable, medium of claim 10, further comprising the step of selecting the lead node responsive to battery status of the plurality of nodes.

13. The non-transitory computer-readable medium of claim 10, further comprising the step of, for each of the plurality of nodes, transmitting a lead status message responsive to a battery status, wherein the lead node is selected as a first node to transmit the lead status message.

14. The non-transitory computer-readable medium of claim 10, further comprising the step of determining the respective predetermined time responsive to the battery status of the lead node.

15. The non-transitory computer-readable medium of claim 10, further comprising the steps of waking up a first non-lead node; obtaining a second status of the lead node; and determining whether the lead node should maintain its networking functionality.

16. The non-transitory computer-readable medium of claim 15, further comprising the step of placing the first non-lead node in a reduced power state for a second predetermined time based on the second status of the lead node when the lead node is determined to maintain its networking functionality.

17. The non-transitory computer-readable medium of claim 15, further comprising the step of transitioning network functionality from the lead node to the first non-lead node when the lead node is determined to not maintain its networking functionality.

18. The non-transitory computer-readable medium of claim 17, further comprising the step of powering down the lead node after network functionality has been transitioned to the first non-lead node.

19. A wireless network device, comprising:
    a transceiver circuit configured to generate a radio signal based on a carrier signal and configured to receive a radio signal based on a carrier signal; and
    a processor that is coupled to the transceiver circuit and configured to:
       detect a power outage within a plurality of power lines that power a plurality of nodes;

in response to detecting the power outage, select a lead node from among the plurality of nodes, wherein each node in the plurality of nodes is configured to access a wireless network, and wherein each node in the plurality of nodes that is not the lead node comprises a non-lead node;

transition network functionality from the non-lead nodes to the lead node; and place each non-lead node in a reduced power state for a respective predetermined time.

* * * * *